INVENTOR.
LEON B. JOZEFOWSKI
BY
Harren Whitesel
ATTORNEY 3,164,688
MANUALLY OPERATED, MULTI-BUTTON INTERLOCKING PUSHBUTTON KEY SET
Leon B. Jozefowski, Chicago, Ill., assignor to International Telephone and Telegraph Corporation, New York, N.Y., a corporation of Maryland
Filed Feb. 13, 1961, Ser. No. 88,919
9 Claims. (Cl. 200—5)

This invention relates to key sets and more particularly to manually operated, multi-button interlocking, pushbutton key sets—especially, although not entirely, adapted for use in telephone subsets.

Recent engineering efforts have been directed to an adoption of logic concepts so that standardized subassemblies may be combined to provide a unique overall effect. Primarily, these efforts have been most pronounced in the field of electronics and very little attention has been directed to applying similar concepts to other scientific fields. A particular non-electronic device well adapted to an application of logic concepts is a manually controlled key set. For example, sometimes it may be desirable to operate two or more keys simultaneously, thus completing two or more electrical circuits, and other times it may be desirable to provide interlocking keys so that operation of one key releases the other keys. On still other occasions, it may be desirable to provide either locking or non-locking keys which may be operated or released independently of the operated or non-operated condition of all other keys.

Accordingly, it is an object of this invention to provide new and improved manually operated, multi-button key sets and more particularly to provide key sets for use in telephone subsets.

Another object of this invention is to provide pushbutton key sets assembled from standardized components to provide interlocking controls over the position of individual keys in the key set. In this connection, it is an object to provide mechanical logic elements which may be selectively assembled to complete desired logic functions relating to the opening and closing of electrical circuits.

A further object of this invention is to provide low cost, reliable key sets. More specifically, an object is to provide long life, trouble free key sets which may be manufactured on standard machine tools with a minimum number of specially designed tools, dies, and the like. Here, an object is to reduce the cost of manually operable pushbutton key sets by simplification and reduction of the component parts thereof.

In accordance with one aspect of this invention, the pushbutton key set includes a base plate having a superstructure attached to one side and a plurality of spring contact assemblies attached to the other side. A plurality of two-position keys or pushbuttons are contained in and supported by the superstructure in a position above the contact springs so that operation of a key or depression of a pushbutton causes the corresponding set of springs to close and restoration of the same key or pushbutton causes the contact springs to open. To provide a logical control over key positions, slide members of standardized configurations are assembled within the superstructure to provide uniquely interlocking pushbuttons by selectively transmitting restoring forces between the pushbuttons as they operate or release.

The above mentioned and other features and objects of this invention together with the manner of obtaining them will become more apparent and the invention itself will be best understood by making reference to the following description of an embodiment of the invention taken in conjunction with the accompanying drawings wherein.

Figure 1:
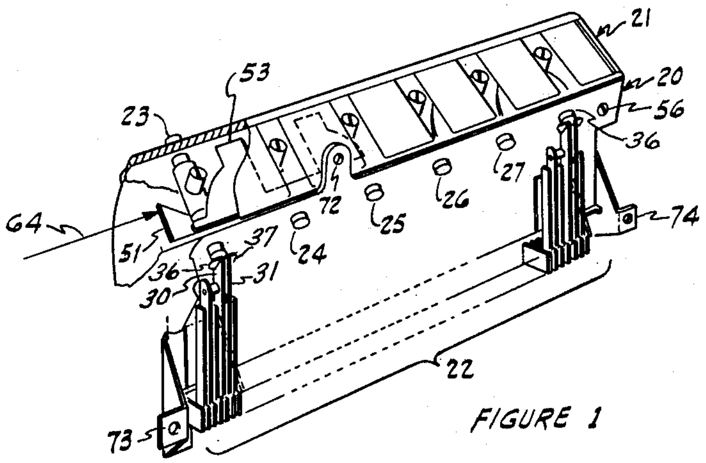
FIG. 1 is a perspective view of the bottom and front of a key set assembly with one end broken away to show a portion of the standardized components assembled therein.

FIG. 1 shows an exemplary manually operated, multi-button key set. The principal components of the key set are a base plate 20 having a superstructure 21 attached to one side and a plurality of contact assemblies 22 attached to the other side. The superstructure is an assembly which includes a self supporting housing which may be a die casting, for example. Each of the spring assemblies includes a number of electrically conductive leaf springs having contact material welded on their outer ends. Their inner ends are bolted together to form a conventional pileup. These springs open and close electrical circuits when mechanically moved.

To control the position of these leaf springs, a pushbuttons or key set assembly includes a plurality of two-position pushbuttons 23–28. Each pushbutton is supported by and guided through the superstructure 21 to move into and out of the spring assembly 22. Preferably, each button is made of wear resistant, electrically insulating material such as nylon. Thus, if the pushbutton 23, for example, is pushed, its lower end moves downwardly into the spring assembly and when the pushbutton is elevated, its lower end moves upwardly and out of the spring assembly.

Figures 2, 3, 10:
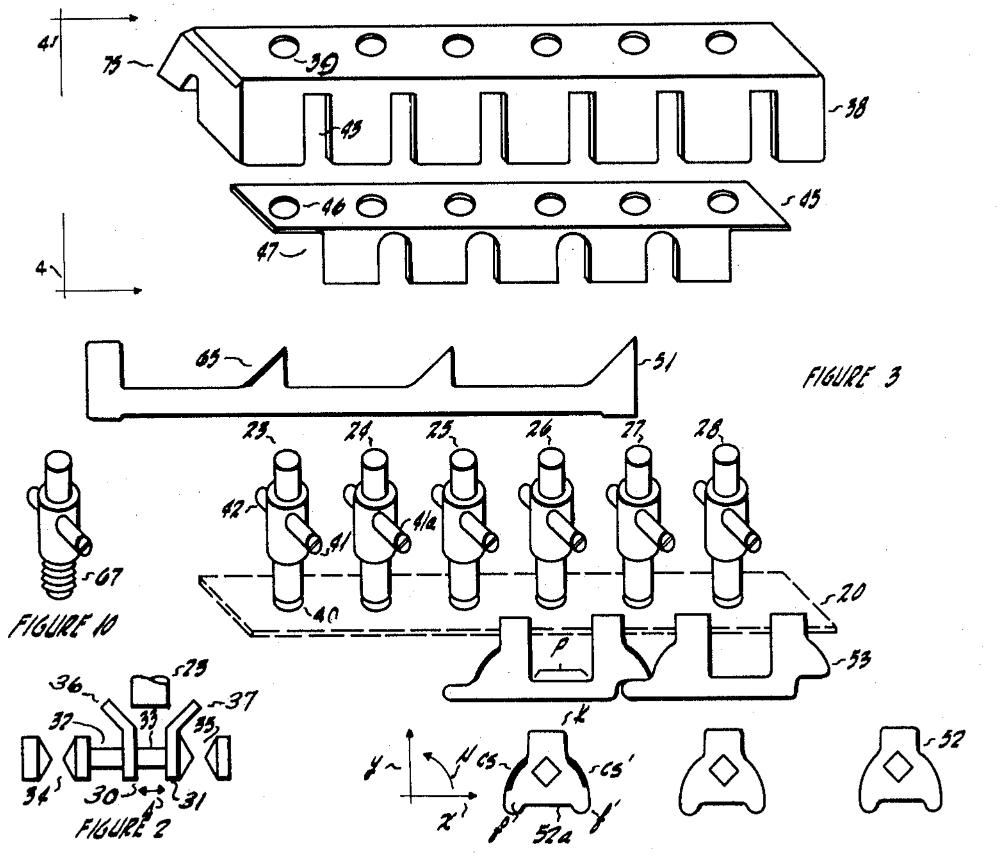
FIG. 2 is an end view of a spring contact assembly and a fragmentary portion of the lower end of a pushbutton.
FIG. 3 is an exploded view of the superstructure assembly and the components assembled therein.
FIG. 10 is a perspective view of a pushbutton and a return spring which provides a non-locking pushbutton logic.

The contact assembly includes a pair of moving operator leaf springs 30, 31 having their outer extremities bent upwardly and outwardly at approximately 45° to provide a pair of cam surfaces 36, 37 for engaging the lower end of the pushbutton 23. As best shown in FIG. 2, downward motion of pushbutton 23 spreads the operator leaf springs 30, 31 in the directions of a double-ended arrow A. Pushers and spacers made of electrically insulating material, such as nylon, are placed between the leaf springs as shown at 32, 33. The pushers transmit moving forces from the operator leaf springs to other springs in the contact assembly. Thus, when the pushbutton 23 bears against the cam surfaces 36, 37, pusher 32 causes contacts 34 to close. The spacer 33 holds the springs 30, 31 apart when button 23 is elevated. The contacts 35 close by motion of operator spring 31 when the button 23 is lowered. The proportions between the end of the pushbutton 23 and the spacing of the springs 30, 31 are such that after the lower end of pushbutton 23 moves past the cam surfaces 36, 37 the vertical flat portions of springs 30, 31 grip the pushbutton and prevent it from moving upward until restoring forces are exerted upon it. An advantage of this arrangement is that the pushbuttons are "non-self-restoring" so that costly restoring springs and complicated locking slides are eliminated.

Next, reference is made to details of the superstructure construction, as best shown in the exploded view of FIG. 3. More specifically, the superstructure includes the diecast housing 38 having a series of openings, one of which is shown at 39, through which the upper ends of the pushbuttons extend. Beneath these openings in the base plate 20 are a series of corresponding axially aligned openings, one of which is shown at 40, for receiving the lower ends of the pushbuttons. Thus, the pushbuttons may slide up and down through the holes 39, 40. To limit the extent of the pushbutton motion, and further to provide a follower for a cam action, as will be explained, each pushbutton is provided with fore and aft followers 41, 42 extending perpendicularly from the line of pushbutton motion. These followers are adapted to slide in individually associated vertical guideways or slots, one of which is shown at 43, fashioned in the diecast housing. The exact nature of the followers 41, 42 is not important to the invention. For example, they may be an integral part of a molding including the entire pushbutton, or they may be a metal bar or setscrew inserted through a mold at a time when the pushbuttons are formed. A particular advantage of a setscrew arrangement is that the followers 41, 42 may be removed from the pushbutton if it should ever be necessary to do so.

Figure 4:
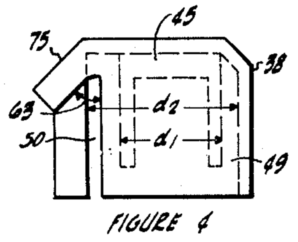
FIG. 4 is an end view of the housing and a bracket of the superstructure assembly taken along line 4—4 of FIG. 3.

Also positioned within the diecast housing and, preferably riveted to the top thereof, is a bracket 45 which may be a partially folded sheet metal punching. A number of holes, one of which is shown at 46, and vertical guideways or slots, one of which is shown at 47, are formed in the bracket 45 to correspond to the holes 39, 40 and the guideway 43. The physical relation between the sizes of the housing and of the bracket may be seen in FIGURE 4 which is an end view thereof. That is, the outer dimension *d1* of the bracket 45 is much narrower than the inner dimension *d2* of the diecast housing 38. Thus, a pair of longitudianl guideways 49, 50 are provided. The standardized logic components are positioned in and guided through these guideways.

Means are provided for selectively transmitting restoring forces through standardized logic components which provide interlocking control over the position of the pushbuttons. These standardized components are here shown as a reset bar 51, a two-pushbutton slide bar 52, and a three-pushbutton slide bar 53. Since all of the two- and three-pushbutton slide bars incorporate the same general principle, reference is made to the specific slide bar 52*a* by way of example. As there shown, the slide bar is a plate of rigid wear resistant material, such as a steel punching, for example. An upstanding key K is formed at the top of the slide bar to engage the side of the forwardly extending followers 41 on the pushbutton, thereby limiting the extent of the sideward excursion of the plate 52. Below this key and oppositely disposed on each side of the plate is an inclined profile which exerts an upward wedging force upon the forwardly extending follower 41 when the plate moves sideward. For convenience of expression, this inclined profile is hereinafter referred to as "cam shoulders" CS, CS'. To assist the reader in locating these cam shoulders, they have been outlined by heavily inked lines in FIG. 3. At the bottom of the plate 52*a* are a pair of feet *f*, *f'* which serve the dual purpose of leveling the plate and providing a pivot point about which it may rock slightly when downward forces are applied to the cam shoulders by a forward follower 41.

By inspection of the drawings, it will be seen that when a forward follower 41 bears downwardly on the left-hand cam shoulder CS, the downward force is translated into a horizontal force to slide the plate 52 in the direction of the arrow *x*. A portion of the force is also translated into a counterclockwise rotary motion as shown by the arrow N. Responsive thereto, an upward force acting in the direction of the arrow *y* pushes upwardly against a forward follower 41*a* on the adjacent pushbutton 24. Thus, it will be apparent that pushing button 23 results in raising button 24 if it is then in a lower position. Obviously, the reverse is also true; if the downward forces act upon cam shoulder CS' responsive to pushing button 24, the directions of the force indicating arrows N and *x* are reversed and the pushbutton 23 is raised.

It is thought that the construction of the three-pushbutton slide bars 53 will be readily apparent from the foregoing description of the two-pushbutton slide bars 52. The chief difference between the two types of slide bars is that a cutout portion *p* provides space in a three-button bar 53 for an intermediate pushbutton follower. This cutout portion is wide enough to eliminate any contact with such an intermediate follower regardless of whether it is or is not in a lowered position. Thus, the three-pushbutton slide bar operatively links non-adjacent keys. Moreover, by extending the lengths of the slide bar and by increasing the distance across the cutout portion *p*, the linkage may be extended to connect four, five or more pushbutton followers.

It is thought that the physical relation between the pushbuttons and all of the slide bars and other superstructure components may be understood best by the following description of how the key set is assembled. First, the bracket 45 is secured to the diecast housing 38 and then the housing is inverted. Thereafter, each of the pushbuttons 23–28 is fitted into the housing-bracket assembly by inserting the upper portion of the pushbuttons through holes such as 39, 46. An enlarged portion on the pushbutton forms a shoulder that limits the distance which the pushbutton may pass through such holes. The fore and aft followers 41, 42 are fitted into the vertical guideway slots 43, 47 and in similar guideways which do not show in the drawings but are in the rear of the housing 38 and the bracket 45. Next, the reset bar 51 is dropped into position in the longitudinal guideway 50 between the rear wall of the housing 38 and the bracket 45. Following this, any convenient number of two-pushbutton slide bars 52 and three-pushbutton slide bars 53 are dropped into the guideway 49 in the front of the housing in a sequence or arrangement determined by the desired pushbutton logic. The thickness of all of these slides and the width of the guideways 49, 50 are such that these slides may be moved either to the left or right with virtually no restraining forces caused by friction between the slides and the guideways. After the slides and pushbuttons are in place, the superstructure is fastened to the base plate by a number of screws, one of which is shown at 56 in FIG. 1. The assembly is now completed and may be inverted to the position shown in FIG. 1.

With the foregoing description of the construction and assembly of a key set in mind, it is thought that the reader will best understand the nature of the invention by the following description of typical pushbutton logic.

Figure 5:
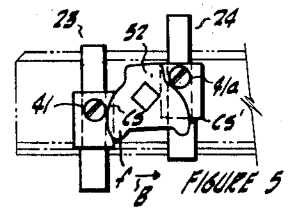
FIGS. 5 and 6 are front elevation views showing one logic arrangement wherein a pair of pushbuttons are interlocked so that either of the two pushbuttons may be pushed individually, but not simultaneously.
Figure 6:
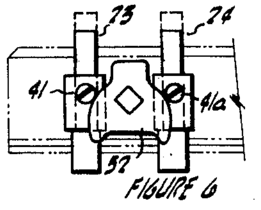

Means are provided for interlocking pushbuttons so that either of two adjacent pushbuttons may be pushed individually, but not simultaneously. More specifically, as shown in FIG. 5, a two-pushbutton slide bar 52 is moved to the right in the direction of arrow B responsive to downward forces exerted by the forward follower 41 upon the cam shoulder CS. The slide bar 52 is also rocked in a counterclockwise direction about the pivot point, foot *f*. Responsive to all of this, an upward force is exerted upon the forward follower 41*a* of the pushbutton 24 thus raising it to an elevated position. If the situation were reversed and pushbutton 24 were being pushed, the effect would be the same except that the slide bar 52 would move in a direction opposite to that shown by arrow B. Thus, either pushbutton 23 or pushbutton 24 may be pressed individually. On the other hand, if the two pushbuttons 23, 24 are pushed simultaneously, as shown in FIG. 6, the two-pushbutton slide bar 52 is centered between the forward followers **41, 41*a* by the downward forces acting upon the cam shoulders CS, CS'. After the slide 52 is centered, it cannot move further. The proportions of the slide 52, the followers 41, 41*a*, and the width of the guideway slots, such as 43, are such that the pushbuttons do not descend into the contact assembly far enough to actuate the springs when the slide bar 52** is thus centered, as shown.

From the foregoing, it should be obvious that the electrical function resulting from the use of two-pushbutton slide bar 52 is that of a bistable electrical circuit wherein an output signal is alternately directed to either of two terminals responsive to an occurrence of each command signal.

Figure 7:
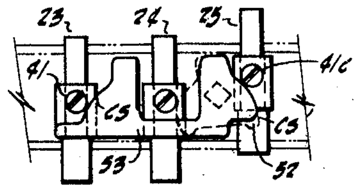
FIGS. 7 and 8 are also front elevation views showing a logic arrangement of three pushbuttons wherein either two pushbuttons may be pressed simultaneously or one pushbutton may be pressed individually with an arrangement for resetting the two pushbuttons when the one pushbutton is pressed or resetting the one pushbutton when either of the two pushbuttons is pressed.
Figure 8:
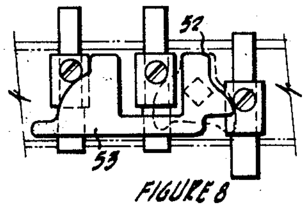

Means are provided for logically interconnecting nonadjacent pushbuttons. Here, either of two adjacent pushbuttons may be pushed simultaneously or one pushbutton may be pushed individually. Both of the two pushbuttons are reset when the one pushbutton is pushed, if they are then in a lower position. Also, the one pushbutton is reset when either of the two pushbuttons are pushed if it is then in a lower position. More specifically, the slide bars which produce this logic function are shown in FIGS. 7, 8 as a combination of a two-pushbutton slide bar 52 and a three-pushbutton slide bar 53. Thus, if the pushbutton 23 (FIG. 7) is pushed, the three-pushbutton slide bar 53 moves to the right because the forward follower bar 41 bears against the cam shoulder CS. When the slide 53 moves to the right, the second cam shoulder CS' exerts an upward force on the forward follower **41*c* of the pushbutton 25, thereby resetting it. Conversely, when pushbutton 25 is pushed, pushbutton 23 is raised for similar reasons. If the three-pushbutton slide bar 53 is used alone, there is no effect on the pushbutton 24. Therefore, for a more sophisticated logic, the two-pushbutton slide bar 52 is interposed between the pushbuttons 24, 25. Thus, the pushbutton 24 is interlocked with the pushbutton 25 in a manner which is apparent from the foregoing discussion of FIG. 5, 6. By inspection of the drawings, it will be apparent that pushbutton 24 may be pushed simultaneously with pushbutton 23 but may not be pushed simultaneously with the pushbutton 25. Also, if the pushbutton 24 is pressed, pushbutton 25 is restored, if in a lowered position, but there is no effect at the pushbutton 23**.

Figure 9:
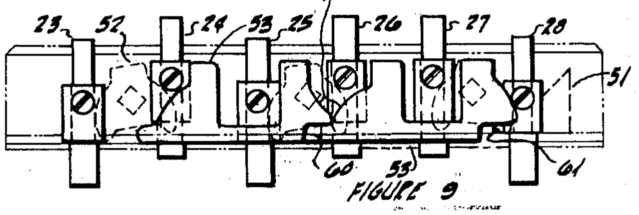
FIG. 9 is a front elevation view showing a more sophisticated assembly of pushbuttons to illustrate how the standardized compounds may be assembled to carry out a single unique logic function.

FIG. 9 carries the sophisticated logic to a final conclusion by illustrating how the pushbuttons may be interlocked to provide an end result. This combination includes three two-pushbutton slide bars 52 and two three-pushbutton slide bars 53. One end of each of the slide bars 53 has an elongated tab portion 60 which mates with a recessed portion 61 formed on the other end of the three-pushbutton slide bar. Thus, forces transmitted by pushing buttons associated with one of the three-pushbutton slide bars may or may not be transferred to another three-pushbutton slide bar depending upon the position of the slide bar at any given time. In this manner, if the three-pushbutton slide bars have been previously moved to a close physical contact, as shown in FIG. 9, restoring forces are exerted upon pushbutton 28 when pushbutton 24 is pushed. This same operation of pushbutton 24 has no effect through slide bars 53, 53 at the pushbuttons 23, 25, or 27. As the two three-button slide bars move together, a gap *g* is closed to raise pushbutton 26 if then lowered or prevent pushbutton 26 from being pushed if then raised. On the other hand, if the pushbutton 26 is pushed after pushbutton 24 is released, the two three-pushbutton slide bars 53 are separated so that pushbuttons 24, 28 are restored if either is in a lowered position. With the arrangement shown in FIG. 9, the two-pushbutton slide bars interlock adjacent pushbuttons 23 and 24, 25 and 26, and 27 and 28.

An advantage of this arrangement is that the pushbutton logic depends only upon an arbitrary selection of the slide bars inserted into the longitudinal guideway 49 between the bracket 45 and the diecast housing 38. Moreover, since no expensive restoring springs are required, and further since the pushbutton slide bars may be manufactured on standard machine tools with a minimum number of specially designed tools and dies, the entire key set is a low cost item. Further, since all forces are transmitted through reliable mechanical linkages, and do not depend upon the maintenance of spring tension, it is also apparent that a reliable key set having a long, trouble free life is provided.

Heretofore, the logic has been described as mechanical interlocks between individual pushbuttons. The invention also contemplates group interlocking wherein a number of pushbuttons are positioned not responsive to pushing another pushbutton but responsive to a force applied by a mechanism outside of the key set assembly. To accomplish this end, the reset slide bar 51 is fitted into the guideway 50 at the rear of the diecast housing 38 and moved by any suitable linkage (not shown) inserted through an opening 63 at the end of the diecast housing. The force applied by such a linkage is symbolicly indicated in FIG. 1 by the arrow 64. The reset bar is provided with a number of arbitrarily located cam shoulders, one of which is shown at 65. Each cam shoulder is designed to engage the aft follower 42 on a pushbutton. Therefore, as the slide bar moves in response to a force applied through the opening 63, the cam shoulder 65 may move to the right to allow the associated pushbutton to be pressed or to the left to raise the pushbutton if in a lowered position. As shown in FIG. 3, the reset bar is designed to raise pushbuttons 24, 26, and 28 when it is moved to the left.

In some cases, pushbutton logic may require a non-locking key which automatically restores as soon as it is released. For this purpose, the pushbutton slide bars are eliminated and a restoring spring 67 is fitted around the lower portion of the pushbutton as shown in FIG. 10.

Figure 11:
FIG. 11 is a perspective view of a telephone subset having a pushbutton or key set assembly (such as that shown in FIG. 1) installed therein.

While those skilled in the art will perceive many uses for the key set, the pushbutton logic described herein was actually used in a telephone subset 68 as shown in FIG. 11. The physical dimensions of the entire key set assembly of FIG. 1 were such that it fit into the standard housing of present day commercial telephone subsets. A number of holes, such as 70, were fashioned in the housing so that the pushbuttons projected upwardly through the housing at a position immediately in front of a standard telephone dial 71. The key set was then secured to a base plate that supports the housing by screws passing through a number of tabs such as tabs 72, 73 formed into the key set structure. In this particular embodiment, the slide bars were assembled as shown in FIG. 9. The pushbuttons 23, 25, 27 were hold buttons which applied holding bridges across telephone lines (not shown). The keys 24, 26, and 28 were talk keys which allowed a subscriber to talk over an individually associated one of these lines.

Assuming that a call is extended simultaneously on each of the lines, each of the buttons 23, 25, and 27 is pressed to place a holding bridge across the associated line. To talk over a first line, the subscriber at the subset pushes the button 24 thereby raising the pushbutton 23, removing a holding bridge from a line, and connecting the telephone transmitter and receiver to that line. Thereafter, the subscriber may push the button 26 to raise the buttons 24, 25 thus breaking the telephonic connection to the first line, and removing the holding bridge from a second line. Still later, the subscriber may push the button 28 thus raising the buttons 26, 27 thereby breaking the telephonic connection to the second line and removing the holding bridge from the third line. When the calling subscriber hangs up, a hook switch assembly (not shown) exerts a force (shown by arrow 64) through the opening 63 to restore certain of the pushbuttons. The self-restoring button of FIG. 10 was used to signal a secretary who also had access to the telephone lines via a similar key set.

It is to be understood that the foregoing description of a specific embodiment of the invention is not to be considered as a limitation upon its scope.

I claim:

1. A manually operated, multi-button key set comprising a row of a plurality of two-position pushbuttons adjacent contact spring assemblies, said pushbuttons being adapted to move to either a raised or a lowered position, said springs being closed by said buttons when in said lowered position and opened by said buttons when in said raised positions, and means comprising a standardized three-pushbutton logic component for linking non-adjacent keys so that either one of said two non-adjacent keys may be pushed individually but both of said two keys may not be pushed simultaneously, said component comprising a plate having a pair of oppositely disposed cam shoulders including an inclined profile which translates downward motion from one of said non-adjacent pushbuttons into upward motion on the other of said non-adjacent pushbuttons, and a cutout portion in said plate for precluding operation of intermediate pushbuttons by said non-adjacent pushbuttons.

2. A manually operated, multi-button key set comprising a base plate having a superstructure attached to one side and a plurality of contact spring assemblies attached to the other side, said superstructure including a housing having a bracket fastened therein with the outer dimension of the bracket being narrower than the inner dimension of the housing, thus providing a pair of longitudinal guideways extending along the front and back of the housing, a plurality of two-position pushbuttons positioned in said superstructure to slide up and down through openings in the bracket and housing, said pushbuttons being positioned intermediate said guideways, each of said pushbuttons having fore and aft extending followers formed therewith, and logic modular components selectively assembled in said guideways for transmitting restoring forces between preselected ones of said pushbuttons.

3. The key set of claim 2 wherein certain of said logic components comprise a plate having a pair of oppositely disposed cam shoulders including an inclined profile which translates downward motion from the follower of one pushbutton into upward motion acting upon the follower of an adjacent one of said pushbuttons.

4. The key set of claim 2 wherein at least some of said components comprise a plate having a pair of oppositely disposed cam shoulders including an inclined profile which translates downward motion from one of said followers into an upward motion upon another of said followers, said other follower being part of a pushbutton which is not adjacent to said first named pushbutton, and a cutout portion in said plate intermediate said cam shoulders for allowing passage of followers associated with other pushbuttons.

5. A manually operated, multi-button key set comprising a base plate having a superstructure attached to one side and a plurality of contact spring assemblies attached to the other side, said superstructure including a plurality of two-position non-self-restoring pushbuttons positioned adjacent to said spring assembly, said springs being closed by said buttons when in one of said positions and opened by said buttons when in the other of said positions, said buttons and said springs being positioned so that said springs apply a gripping force to hold said buttons when in said other positions and prevent their return to said one position, and means comprising a group interlocking device for resetting selected ones of said pushbuttons responsive to forces applied by a mechanism outside of said key set.

6. They key set of claim 5 wherein said group interlock means comprises a reset slide bar having a plurality of cam shoulders for resetting said selected ones of said pushbuttons when said slide bar is moved responsive to said applied force.

7. The key set of claim 6 and a plurality of standardized logic components each comprising a plate having a pair of oppositely disposed cam shoulders including an inclined profile which translates downward motion from one pushbutton into upward motion acting upon another of said pushbuttons.

8. A manually operated, multi-button key set comprising a base plate having a superstructure attached to one side and a plurality of contact spring assemblies attached to the other side, said superstructure including a housing having a bracket fastened therein with the outer dimension of the bracket being narrower than the inner dimension of the housing, thus providing a pair of longitudinal guideways extending along the front and back of the housing, a plurality of non-self-restoring two-position pushbuttons positioned in said superstructure to slide up and down through openings in the bracket and housing, said pushbuttons being positioned intermediate said guideways, each of said pushbuttons having fore and aft extending followers formed therewith and extending into said guideways, logic modular components selectively assembled in one of said guideways for transmitting restoring forces between preselected individual ones of said pushbuttons via said forward followers, and a reset bar in the other of said guideways for transmitting restoring forces to groups of said pushbuttons via said aft followers.

9. The key set of claim 8 wherein at least some of said modular components comprise a plate having a pair of oppositely disposed cam shoulders including an inclined profile which translates downward motion from one of said forward followers into an upward motion upon another of said forward followers, and said reset bar comprises a plate having a number of cam shoulders for exerting an upward force on aft followers of said pushbuttons when said reset bar is moved sideways by forces applied by mechanisms outside of said key set.

References Cited by the Examiner

UNITED STATES PATENTS

| | | | |
|---|---|---|---|
| 1,152,963 | 9/15 | Mueller. | |
| 1,190,727 | 7/16 | Christie | 200—5 |
| 1,699,172 | 1/29 | Weiland. | |
| 2,502,042 | 3/50 | Hasselbaum | 200—5 |
| 2,622,138 | 12/52 | Cooper | 200—5 X |
| 2,691,702 | 10/54 | Allison. | |
| 2,713,092 | 7/55 | Rucks et al. | 200—5 |

FOREIGN PATENTS

| | | |
|---|---|---|
| 187,169 | 10/56 | Austria. |

BERNARD A. GILHEANY, *Primary Examiner.*

MAX L. LEVY, *Examiner.*